Figure 1:
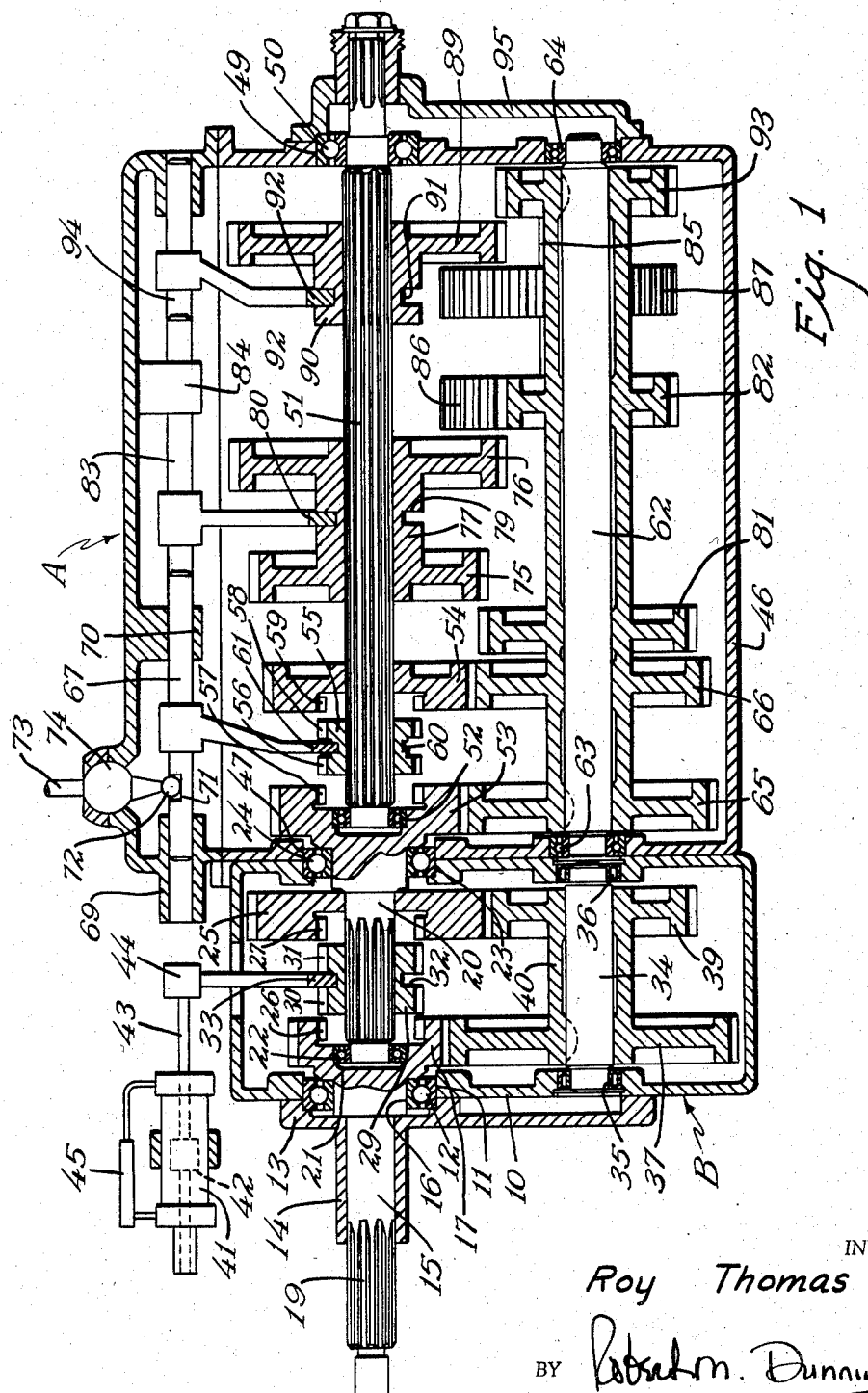

May 19, 1959     R. THOMAS     2,886,982
AUXILIARY TRANSMISSIONS
Filed Aug. 11, 1954     2 Sheets-Sheet 1

INVENTOR
Roy Thomas
BY Robert M. Dunning
ATTORNEY

May 19, 1959  R. THOMAS  2,886,982
AUXILIARY TRANSMISSIONS

Filed Aug. 11, 1954  2 Sheets-Sheet 2

INVENTOR
Roy Thomas
BY
ATTORNEY

United States Patent Office 2,886,982
Patented May 19, 1959

2,886,982

AUXILIARY TRANSMISSIONS

Roy Thomas, Clear Lake, Wis.

Application August 11, 1954, Serial No. 449,159

3 Claims. (Cl. 74—745)

This invention relates to an improvement in auxiliary transmissions and deals particularly with an attachment for a multi-speed transmission to increase the speed range of the driven shaft.

Various types of transmissions have been produced for use on trucks, buses and the like to provide a considerable number of speeds. In certain of these transmissions the drive shaft enters a main transmission and is connected through suitable gears to a driven shaft, the gears being arranged to provide a considerable number of speed variations. The main transmission is then connected to an auxiliary transmission capable of either maintaining the speed of the driven shaft or in increasing or decreasing the speed of the driven shaft to suit driving conditions. With such an arrangement a dual set of speed ranges are provided depending upon the auxiliary transmission or attachment.

While transmissions of this type have been widely used, one difficulty is normally experienced. When the auxiliary transmission is set to produce a first range of speeds, the speed of the motor must be reduced to a predetermined extent to shift the main transmission into the next speed. However, when the auxiliary transmission is set to produce the second range of speeds, the engine speed must be reduced a considerably different amount in order to shift the gears in the main transmission. As a result driving is made more difficult and more conscious effort must be exerted by the driver in shifting through the two ranges of speeds.

An object of the present invention resides in the provision of a main transmission and of an auxiliary transmission attached thereto, this auxiliary transmission being inserted between the drive shaft and the main transmission. The auxiliary transmission is capable of driving the drive shaft of the main transmission at either of two or more different speeds. With this arrangement the engine speed may be reduced a substantially constant amount in either speed range in order to shift to the next gear.

An added feature of the present invention lies in the fact that my auxiliary transmission greatly reduces the wear upon the main transmission. By positioning the auxiliary transmission between the engine and the main transmission, the speed of rotation of the drive shaft entering the main transmission can be considerably reduced when the transmission is operating in the lower speed range, thus correspondingly reducing the wear upon the bearings and gears of the main transmission. In previous constructions where the auxiliary transmission was between the main transmission and the load being driven, the main transmission was always subject to the speed of the engine. With the present arrangement the auxiliary transmission reduces the speed of rotation before it enters the main transmission. As the auxiliary transmission is relatively simple and inexpensive as compared to the main transmission, this feature is of considerable importance.

These and other objects and novel features of my invention will be more clearly and fully set forth in the following specification and claims.

In the drawings forming a part of my specification:

Figure 1 is a longitudinal sectional view diagrammatically through a transmission showing the arrangement of parts in the auxiliary transmission and main transmission.

Figure 2:
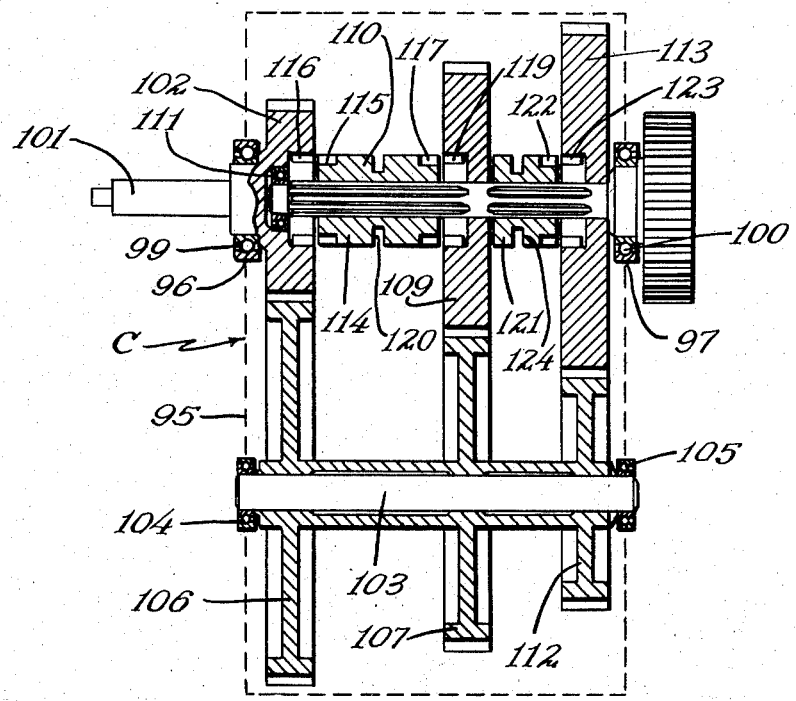

Figure 2 is a diagrammatical view of a modified form of auxiliary transmission. The main transmission is indicated in general by the letter A and the auxiliary transmission is indicated in general by the letter B. The two transmissions are connected together in any suitable manner or may be independently supported in fixed relation.

The auxiliary transmission

The auxiliary transmission B includes a housing 10 of suitable shape and design to accommodate the gears of this transmission. The housing 10 is provided with an opening 11 in the forward wall and a bearing 12 is supported in this opening. A closure plate 13 equipped with a shaft enclosing sleeve 14 is bolted or otherwise attached to the housing 10 to lie outwardly of the bearing 12. A drive shaft 15 includes an enlarged diameter portion 16 rotatably supported by the bearing 12 and also includes a gear 17 which may be integral therewith or attached securely thereto. The drive shaft 15 is shown as having a splined forward end 19 designed for connection with the engine or other suitable drive mechanism.

A second shaft 20 is supported in axial alignment with the shaft 15. The end of the shaft 15 supporting the gear 17 is provided with an axial socket 21 which supports a bearing 22. This bearing 22 encircles the end of the shaft 21 to act as a support therefor. An opening 23 is provided in the wall of the housing 10 opposite that having the opening 11 and a bearing 24 is supported in this opening 23. Thus the shaft 20 may rotate freely with respect to the shaft 15.

A gear 25 is supported upon the shaft 20 to rotate freely with respect thereto. The gear 17 is provided with internal gear teeth 26 and the gear 25 is similarly provided with internal gear teeth 27. A sleeve 29 is splined to the shaft 20 and is slidable thereon. The sleeve 29 is provided with one set of external teeth 30 engageable with the gear teeth 26 and a second set of gear teeth 31 which may mesh with the gear teeth 27 of the gear 25.

A peripheral groove 32 is provided in the sleeve 29 for accommodation of a shifting fork 33 capable of shifting the sleeve 29 into three different positions. In the center position shown the sleeve 29 is in neutral position and no power will be transmitted through the auxiliary transmission B. In the lefthand position, the teeth 26 and 30 will engage to drive the shaft 20 with the shaft 15. When in the righthand position, the teeth 27 and 31 will engage to drive the gear 25 with the shaft 20.

A countershaft 34 is supported by bearings 35 and 36 supported by the housing 10, the shaft 34 being parallel to the shafts 15 and 20. A gear 37 is mounted upon the countershaft 34 to rotate therewith, this gear 37 being in constant mesh with the gear 17. A second gear 39 is mounted upon the shaft 34 to rotate therewith, this gear 39 being in constant mesh with the external teeth of the gear 25. In the particular arrangement illustrated the gears 37 and 39 are connected by a sleeve 40 which holds the gears in proper relation.

A pneumatic or hydraulic cylinder 41 is supported in fixed relation to the housing 10 and includes a piston or plunger 42 connected by a shaft 43 to the handle end 44 of the shift yoke 33. The plunger 42 may be operated by any source of fluid supply indicated in general by the numeral 45 to shift the yoke 33 from one position to another. In cases where a neutral speed is unessential in the transmission, the piston 42 may shift the sleeve 29 merely between its two extreme positions.

From the foregoing explanation it will be obvious that when the drive shaft 15 rotates, the driven shaft 20 which actually comprises the drive shaft of the main transmission A may be driven at the same speed as the shaft 15 by shifting the sleeve 29 so that the teeth 26 and 30 engage. By shifting the sleeve 29 to its other extreme position so that the teeth 31 of the sleeve engage the teeth 27 of the gear 25, the shaft 20 will be driven at a considerably lower speed. This is caused in the particular arrangement shown by the difference in size of the various gears, the gear 17 being of considerably smaller diameter than the gear 37 and thus driving the countershaft at a considerably lower speed than that of the shaft 15. The speed is further reduced by the fact that the gear 39 is of smaller diameter than the gear 25 with which it meshes, so that when the gear 25 is connected through the sleeve 29 to the shaft 20, this shaft will rotate at a considerably slower rate than the shaft 15.

*The main transmission*

The details of the main transmission are not of importance in the present invention as the auxiliary transmission may be connected to virtually any type of main transmission. However, for the purpose of illustration, one typical form of main transmission is shown and will be described.

The main transmission A includes a housing 46 having aligned openings 47 and 49 at opposite ends thereof. In the particular arrangement illustrated the opening 47 is directly adjacent to the opening 23 of the auxiliary housing and the bearing 24 is mounted in both openings 23 and 47. A bearing 50 is mounted in the opening 49, and is designed to support a driven shaft 51. The forward end of the shaft 51 is supported by a bearing 52 mounted within an axial socket in the enlarged end of the shaft 20. The enlarged end of the shaft 20 is provided with an integral gear 53 or with a gear integrally connected thereto.

A second gear 54 is mounted upon the shaft 51 in spaced relation to the gear 53. A sleeve 55 is slidably supported upon the shaft 51 and is spline connected thereto. The sleeve 55 is provided with one set of clutch or gear teeth 56 which engage internal teeth 57 on the gear 53. The sleeve 55 is also provided with a second set of external teeth 57 designed to engage internal teeth 59 of the gear 54. The sleeve 55 is provided with a peripheral groove 60 which is engaged by a shifting fork 61 so that the sleeves may be moved selectively into engagement with either set of internal teeth 57 or 59 or may position the sleeve 55 in a neutral position shown.

A countershaft 62 is rotatably supported by bearings 63 and 64 at opposite ends of the transmission housing. A gear 65 is mounted upon the countershaft 62 and is in constant mesh with the gear 53. A somewhat smaller gear 66 is also mounted upon the center shaft 62 and is in constant mesh with the gear 54. The gear 54 rotates freely upon the shaft 51 unless the internal teeth 59 of this gear are engaged with the sleeve teeth 57. The gears 65 and 66 are connected for rotation in unison and with the shaft 62.

A shaft 67 is slidably supported in bearings 69 and 70 to slide parallel to the axes of the shafts 51 and 62. A notch 71 is provided in the shaft 57 which is engageable with the end 72 of a shift lever 73 pivotally supported at 74 upon the housing 46. Longitudinal sliding of the rod 67 will slide the sleeve 55 from one position to another.

A pair of driven gears 75 and 76 are connected by a sleeve 77 to rotate in unison. The sleeve 77 is provided with a peripheral groove 79 designed to accommodate a shifting fork 80. The gear 75 may be moved into engagement with a cooperable gear 81 on the countershaft 62 and rotatable therewith. By sliding the pair of gears 75, 76 in the opposite direction the gear 76 may be engaged with a gear 82 which rotates with and is mounted upon the counter shaft 62.

A rod or shaft 83 is slidably supported in side by side relation to the shaft 67 and is mounted upon bearings such as 84. The shaft 83 is provided with a notch 71 similar to that in the shaft 67 and in which the end 72 of the shift lever 73 may engage. The shaft 83 may be moved parallel to the axes of the shafts 51 and 62 by movement of the shift lever 73.

A third countershaft 85 is mounted within the housing 46 by suitable bearings, this countershaft being illustrated behind the shaft 62 and parallel thereto. A gear 86 is mounted upon the countershaft 85 in mesh with the gear 82, the gear 86 being out of the path of movement of the gear 76 so as not to interfere with the operation thereof. A gear 87 is supported upon the third countershaft 85 to rotate in unison therewith and with the gear 86. A gear 89 is slidably supported upon the shaft 51 and is movable into mesh with the gear 87 upon sliding movement of the gear 89 to the left in the drawing. A sleeve or hub 90 is integral with the gear 89 and is provided with a groove 91 designed to accommodate a shifting fork 92. A gear 93 is mounted upon the countershaft 62 for rotation in unison therewith, this gear 93 being engageable with the gear 89 upon sliding movement of the gear 89 to the right from the position shown in the drawings. The shifting fork 90 is connected to a shaft 94 slidably supported for axial movement parallel to the axis of the shaft 51. The shaft 94 is in side by side relation to the shafts 67 and 83 and is provided with a notch 71 similar to the notch in the shaft 67. The notch 71 may be engaged by the end 72 of the shift lever 73 to slide the gear 89 into either extreme position or into the neutral position illustrated.

The end of the shaft 51 is partially enclosed by a closure plate 95 which also extends over the end of the countershaft 62 and of the third countershaft 85. The end of the shaft 51 projects through the cover plate 99 for driving a suitable load. The provision of plural sliding shafts such as 67, 83 and 94 for operating individual shifting forks and the provision of notches in the shafts for engagement by a shift lever is not illustrated in detail as the arrangement is old in the art.

*Operation of the transmission*

The auxiliary transmission B is capable of producing two driven speeds, one of which is equal to that of the drive shaft and the other of which is preferably considerably slower than that of the drive shaft. When the air or hydraulic piston 42 is moved to one extreme position, the teeth 26 of the gear 17 are engaged with the teeth 30 of the sleeve 29 so that the shaft 20 rotates at the speed of the drive shaft. During this arrangement with the particular construction illustrated the gear 25 is rotated through the gears 17 and 37 and the gears 39 and 25. However, as the gear 25 is free upon the shaft 20, no difficulty will result.

Another sleeve 29 is shifted by movement of the piston 42 to its opposite extreme position, the gear 25 is connected to rotate with the shaft 20, the drive shaft 19 acting through the meshing gears 17 and 37 and the gears 39 and 25 to rotate the shaft 20 at a speed less than the speed of the drive shaft 15.

Thus it will be seen that when the sleeve 29 is moved to the right the drive shaft 20 of the main transmission A will be driven at a relatively slow speed, thereby providing one range of speeds within the main transmission. When the drive shaft 15 directly drives the shaft 20, a higher range of speeds in the main transmission is provided.

The various gears 66, 81, 82 and 93 are of gradually smaller diameter, the gear 66 being largest of the four and the gear 93 being smallest of the four. The corresponding gears 54, 75, 76 and 89 on the driven shaft 50 are of correspondingly increasing size, the gear 54 being of smallest diameter and the gear 89 being of largest diameter.

With the piston 42 being moved to the right to engage the drive shaft 15 to the shaft 20 to provide a relatively low speed therein, a series of low speed ranges may be provided in the main transmission A. With the gear 89 engaged with the gear 93, rotation of the shaft 20 will act through the intermeshing gears 53 and 65 and the gears 93 and 89 to produce a first or lowest speed. By moving the gear 89 to neutral position and engaging the gear 76 with the gear 82, a second lowest speed is obtained. By shifting the gears 75 and 76 to the left to engage the gears 75 and 81, a third lowest speed is obtained. By moving the gears 75 and 76 into neutral position and engaging the teeth 57 of the sleeve 55 with the internal teeth 59 of the gear 54, the gear 54 will be connected to the driven shaft 51 and the power will be transmitted through the meshing gears 53 and 65 and the meshing gears 66 and 54 to drive the driven shaft at a fourth lowest speed. By shifting the sleeve 55 to the left so as to connect the teeth 56 of the sleeve and 57 of the gear 53, the shaft 51 will be connected to the shaft 20 to rotate at the same speed, thus providing a fifth lowest speed. The transmission may then be shifted to a high speed range by moving the sleeve 55 into neutral position and operating the piston 42 to move the sleeve 29 to the left, thereby driving the shaft 20 at the same speed as the drive shaft 15. The main transmission may then be operated through its range of shifts to provide five additional speeds. The sixth lowest speed is produced by engaging the gear 89 with the countershaft gear 93 which is constantly driven through the gears 53, 65. By moving the gear 89 into neutral position and shifting the gears 75, 76 so that the gear 76 engages the gear 82, a seventh lowest speed is provided. By moving the gears 75, 76 to the left until the gear 75 meshes with the gear 81, an eighth lowest speed is provided. By moving the gears 75, 76 into neutral position and sliding the sleeve 55 to the right to connect the gear 54 with the driven shaft 51, a ninth lowest speed is provided. By moving the sleeve 55 to the left so as to drive the shaft 51 at the same speed as the shaft 20 a tenth speed or highest speed is provided. In addition to the speeds mentioned, there are two reverse speeds. When the gear 89 is moved into engagement with the gear 87 on the third countershaft 85, a reverse rotation is provided due to the constant meshing of the gears 82 and 86, the latter of which drives the gear 87 constantly. When the sleeve 29 of the auxiliary transmission B is moved to the right, a low reverse speed is obtained. When the auxiliary transmission sleeve 29 is moved to the left a relatively high reverse speed is obtained.

Not only does the arrangement described produce a substantial saving in wear of the main transmission but also I have found that the spread between the various successive speeds in both speed ranges remains substantially constant. When the transmission is used upon a truck and the transmission is set to produce the lowest speed, it is usual practice to accelerate the engine until the speed reaches a predetermined speed of rotation as for example 2900 r.p.m. The clutch is disengaged and the motor speed allowed to reduce approximately 400 r.p.m. at which time the transmission is shifted into the second lowest speed. This same operation may be continued until the transmission is engaged in its highest speed. In transmissions where the auxiliary transmission is rearwardly of the main transmission, a different effect is provided. When the transmission is in its lower speed range, the transmission may be readily shifted from one speed to another upon drop in engine speed of perhaps 400 r.p.m. However, when the transmission is in its high speed range, the engine speed must be reduced a considerably greater amount before the transmission can be successively shifted from one speed to another. This fact takes conscious effort on the part of the driver to properly reduce the engine speed when shifting as the spread is not uniform when the auxiliary transmission is in its two extreme positions.

*Modified form of auxiliary transmissions*

In Figure 2 of the drawings I disclose a modified form of auxiliary transmission. In this form of construction the auxiliary transmission is capable of providing three different speed ranges in place of the two ranges described in conjunction with the auxiliary transmission B. The auxiliary transmission C includes a housing 95 which is similar to the housing 10 but is large enough to include an extra set of gears. In the transmission C the housing is provided with opposed openings 96 and 97 which support bearings 99 and 100. The drive shaft 101 is connected to the engine or other source of power supply and includes on its inner end a gear 102. A countershaft 103 is supported by suitable bearings 104 and 105 and this countershaft supports a gear 106 which is in constant mesh with the gear 102 on the drive shaft 101 so as to constantly drive the countershaft. A gear 107 is mounted upon the countershaft 103 to rotate in unison therewith and a cooperable gear 109 is mounted upon a shaft 110 which is parallel to the countershaft 103 and which is axially aligned with the drive shaft 101. A bearing 111 within the gear 102 supports the end of the shaft 110 and this shaft is further supported by the bearing 100.

An additional gear 112 is mounted upon the countershaft 103 and is in mesh with a gear 113 on the driven shaft 110. This driven shaft extends into the main transmission A which is not shown in Figure 2 and takes the place of the gear 53 shown in Figure 1.

A sleeve 114 is slidably keyed or splined to the shaft 110 and includes external teeth 115 which are engageable with internal teeth 116 on the gear 102. The sleeve 114 also includes teeth 117 which are engageable with teeth 119 on the gear 109. A groove 120 extends about the sleeve 114 and is engaged by a suitable shifting fork which can engage either of the gears 102 or 109 to the shaft 110 to rotate in unison therewith, or the sleeve 114 may be held in a neutral position.

A second sleeve 121 is keyed or splined to the shaft 110 and includes teeth 122 engageable with internal teeth 123 on the gear 113. A groove 124 encircles the sleeve 121 and may be engaged by a suitable shifting fork, not illustrated, by means of which the gear 113 may be connected to the shaft 110.

In operation, the relatively small gear 102 is in constant mesh with the gear 106, rotating the countershaft 103, which in turn rotates the gears 109 and 113 which may normally rotate freely about the driven shaft 110. If the sleeve 114 is moved to the right from the position shown, power is transmitted through the gears 102 and 106 to the countershaft 103 and through the smaller gear 107 and gear 109 to drive the shaft 110, the teeth 117 and 119 being in engagement.

To drive the driven shaft at a slower speed, the sleeve 114 is placed in neutral and the sleeve 121 is moved to the right to engage teeth 122 and 123 and to connect the gear 113 to the driven shaft. As the gear 112 is smaller than the gear 107 and the gear 113 is larger than the gear 109, a slower speed of rotation of the driven shaft is effected.

If a higher speed of rotation of the main transmission drive shaft 110 is desired, the sleeve 121 is moved to the left to disengage the teeth 122 and 123 and the sleeve 114 is also moved to the left. The sleeve 114 then causes the shaft 110 to rotate at the same speed as the drive shaft 101, the teeth 115 and 116 being engaged.

Thus, it will be seen that with this form of construction the main transmission is capable of producing fifteen different speed shifts, each series of five being produced by proper operation of the auxiliary transmission C. In a similar manner greater numbers of speed changes may also be produced.

In accordance with the patent statutes, I have described the principles of construction and operation of my auxiliary transmission, and while I have endeavored to set forth the best embodiment thereof, I desire to have it understood that obvious changes may be made within the scope of the following claims without departing from the spirit of my invention.

I claim:

1. A transmission construction including a main transmission and an auxiliary transmission, said main transmission including a driven shaft and a parallel counter shaft, a housing enclosing and supporting said shafts, said driven shaft extending from said housing, a main transmission drive shaft extending from said housing in axially aligned relation to said driven shaft, cooperable gears on said drive shaft and said counter shaft to drive said counter shaft with said drive shaft, a series of gears of different sizes on said counter shaft and said driven shaft operable, when operated, for driving said driven shaft at a corresponding series of speeds, cooperable means on said drive shaft and driven shaft and operable, when actuated, for driving said last mentioned shafts in unison, said auxiliary transmission including an auxiliary drive shaft, aligned with said main transmission drive shaft, and an auxiliary counter shaft, gear means on said auxiliary drive shaft and said auxiliary counter shaft for connecting the same for rotating the auxiliary counter shaft, a gear means on said main transmission drive shaft and said auxiliary counter shaft operable, for driving said main transmission drive shaft at a lower speed than that of the auxiliary drive shaft and at a speed lower than the lowest of said series of speeds at which said main transmission driven shaft is driven when said main transmission drive shaft and said auxiliary drive shaft are rotating at the same speed, and cooperable means on said auxiliary drive shaft and said main transmission drive shaft operable, when engaged, for rotating said last named shafts at the same speed.

2. The structure described in claim 1 and in which the series of gears on said main transmission driven shaft and said main transmission counter shaft are in pairs and cooperate, when in mesh and connected for rotation to their respective shafts, to drive the driven shaft at a speed less than the speed of the main transmission drive shaft.

3. A transmission construction including a main transmission and an auxiliary transmission, the main transmission including a first drive shaft, a first driven shaft aligned therewith, and a first parallel countershaft, cooperable gear means on said first drive shaft and said first countershaft to drive these shafts in unison, cooperable means on said first drive shaft and said first driven shaft operable, when engaged, to directly interconnect said shafts for rotation in unison, three pairs of cooperable gears on said first counter shaft and said first driven shaft, each pair of gears being operable, when in mesh and connected for rotation with their respective shafts for driving said first driven shaft at a speed below that of the first drive shaft, said auxiliary transmission including a second drive shaft, said first drive shaft, and a second parallel counter shaft, cooperable gear means on said second drive shaft and said second counter shaft for driving said second counter shaft, cooperable gear means on said second counter shaft and said first drive shaft operable to drive said first drive shaft at a speed substantially lower than that of said second drive shaft, cooperable means on said second drive shaft and on said first drive shaft operable, when engaged, to cause operation of said second and first drive shafts in unison, the gear ratios of said cooperable gear means being such that when said second drive shaft is rotating said first drive shaft through said second counter shaft, and the second drive shaft is rotating at a predetermined rate of speed, the highest speed obtainable in said first driven shaft will be less than that which may be obtained when the second drive shaft is directly connected to the first drive shaft.

References Cited in the file of this patent

UNITED STATES PATENTS

| | | |
|---|---|---|
| 2,161,153 | Gallun et al. | June 6, 1939 |
| 2,185,730 | Griswold | Jan. 2, 1940 |
| 2,487,735 | Sherman et al. | Nov. 8, 1949 |
| 2,489,699 | Clark | Nov. 29, 1949 |
| 2,637,221 | Backus et al. | May 5, 1953 |